United States Patent Office 3,606,741
Patented Sept. 21, 1971

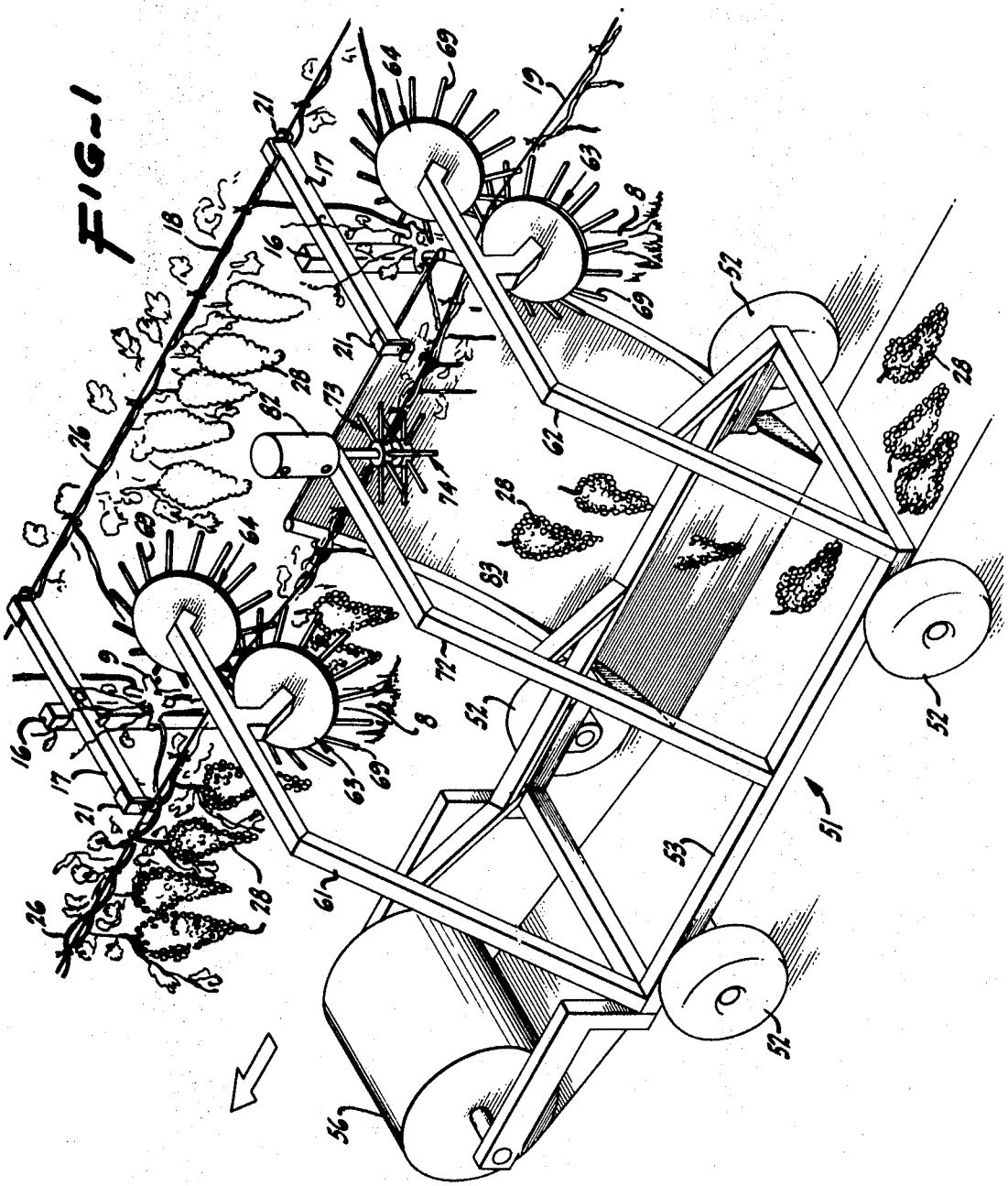

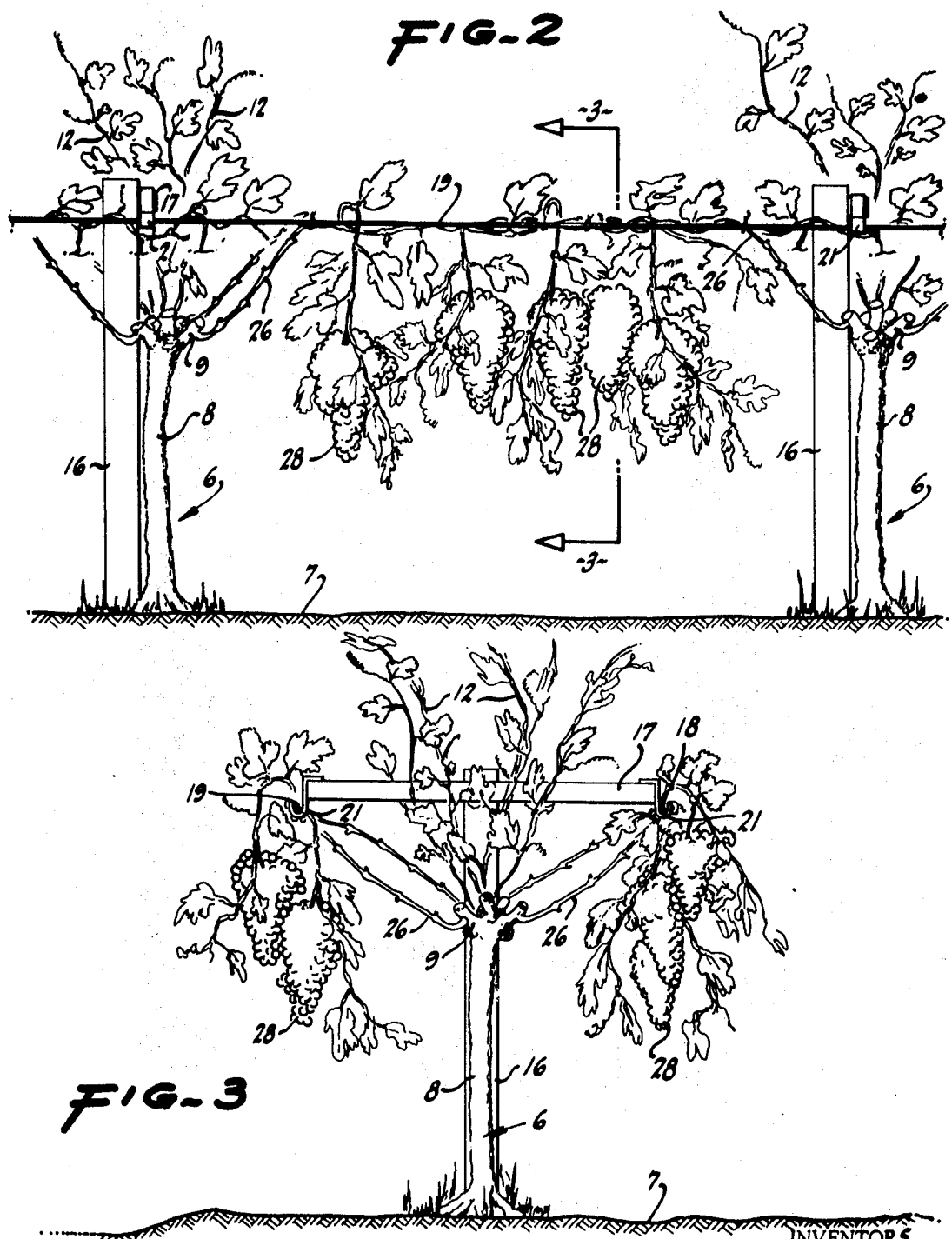

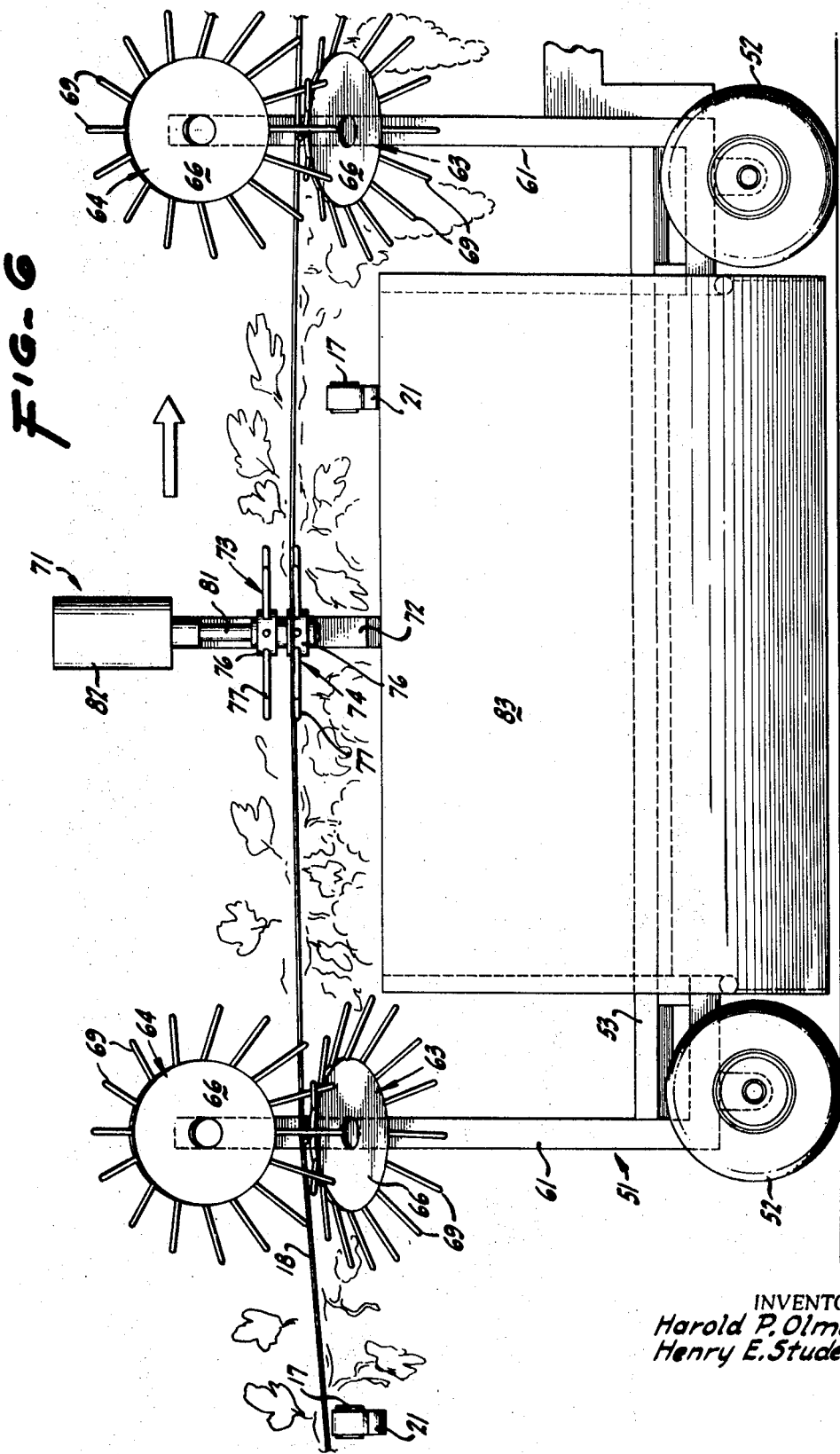

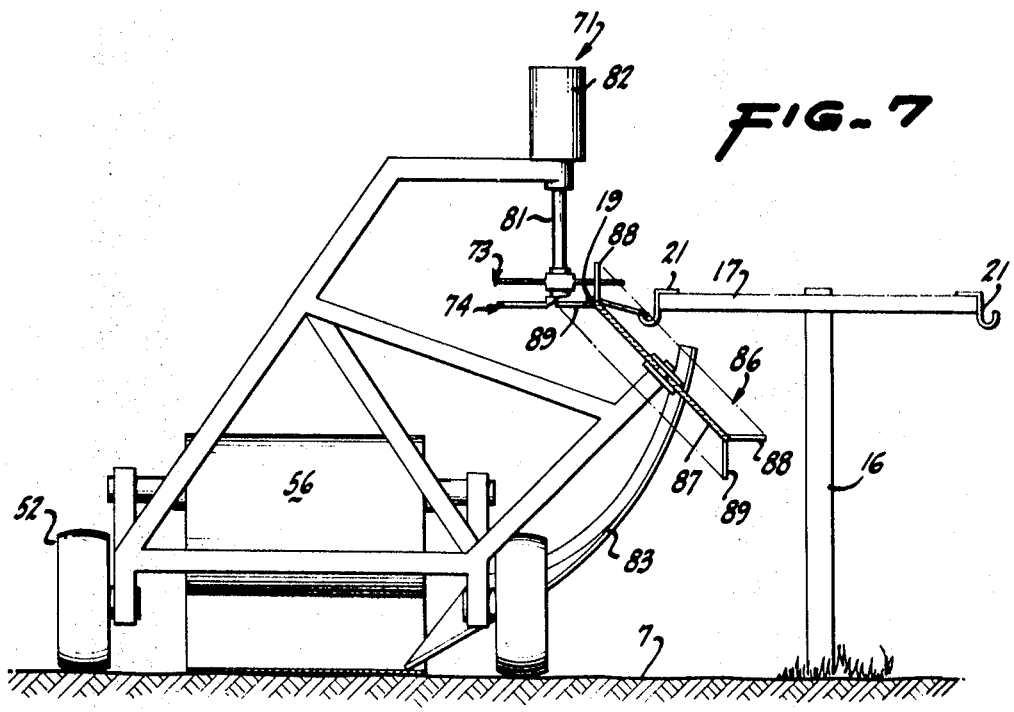
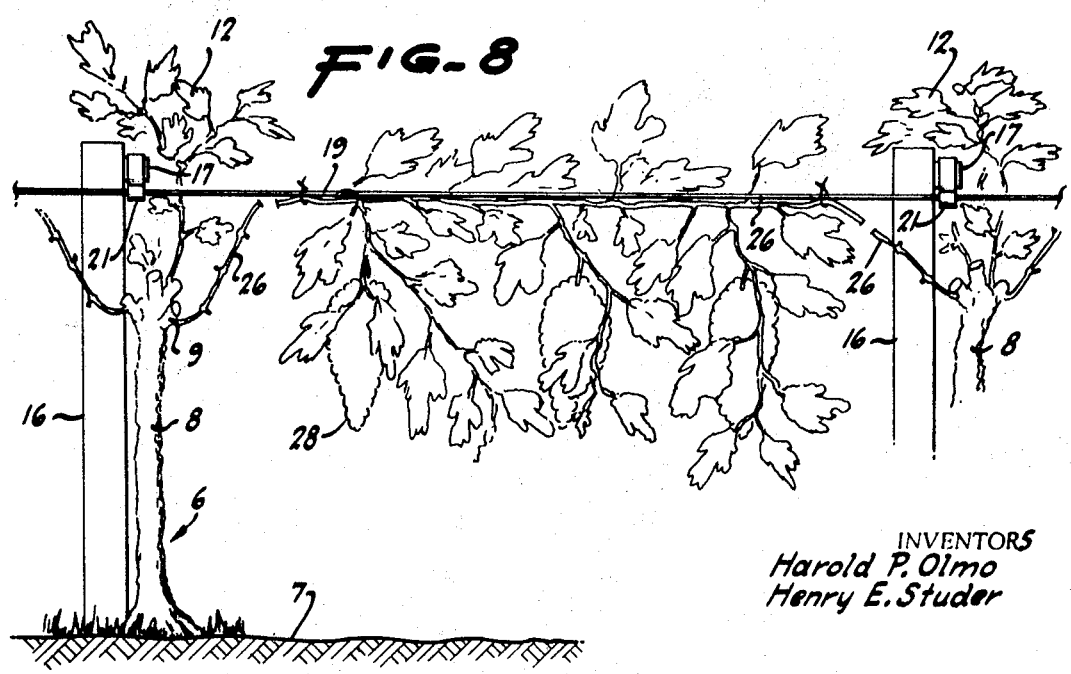

3,606,741
METHOD FOR HARVESTING GRAPES
Harold P. Olmo and Henry E. Studer, Davis, Calif., assignors to The Regents of the University of California, Berkeley, Calif.
Original application Dec. 15, 1965, Ser. No. 514,049, now Patent No. 3,490,217, dated Jan. 20, 1970. Divided and this application Mar. 19, 1969, Ser. No. 822,780
Int. Cl. A01g *19/00*
U.S. Cl. 56—1                                                    5 Claims

ABSTRACT OF THE DISCLOSURE

A method of harvesting grapes includes training a last season shoot from the vine trunk to extend along a horizontal trellis wire to serve as a present season fruiting cane. The fruiting cane may be severed from the trunk prior to harvesting. The wire and fruiting cane are struck with a jerk in a substantially vertical direction to dislodge the grapes as berries and as bunches.

CROSS REFERENCE TO RELATED APPLICATION

This application is a division of application Ser. No. 514,049, filed Dec. 15, 1965, now Pat. No. 3,490,217.

Our invention relates to a manner of harvesting grapes and a machine for harvesting grapes so arranged and coordinated that, by choice, either grape bunches or individual grape berries can readily be retrieved from the vines on which they grow in a single, expeditious, beneficial and economical fashion.

In the present culture of grapes, except for some experimental work, the picking of ripened grapes and grape bunches from the grape vine is accomplished by hand. Some attempts to provide machines for this purpose have not proved uniformly successful for various reasons. A good prior attempt at providing such a device is disclosed in Paper No. 61–124 of the American Society of Agricultural Engineers, P.O. Box 229, St. Joseph, Mich., entitled "Mechanical Grape Harvesting Research At Cornell—III" by E. Stanley Shepardson and Henry E. Studer, one of the co-inventors herein, the paper having been presented at Iowa State University, Ames, Iowa, June 25–28, 1961. In that presentation there is disclosed a machine which travels along a row of grape vines planted in a vineyard. The machine has agitating or vibrating fingers which project into the growing grape vines and by contact shake or vibrate the adjacent portions of the vine and grape bunches. The agitation or vibration dislodges the grapes from the vine, but it does so by detaching the individual grape berries from the bunch as well as separating the bunches from the vine. That is, there is a high percentage or amount of separate grape berries and a relatively low percentage or amount of complete grape bunches detached.

A disadvantage of detaching individual, growing grape berries is that the removal of the berry from its pedicel leaves a gap in the continuous covering of the berry. The gap may even be enlarged by splits or tears or cracks caused by the mechanical dislodgment. This destroys the integrity of the berry and permits disintegration to begin.

In many instances, particularly when the aim is to make wine, it is highly advantageous to separate the grape bunches from the vine in intact form with few or no separate berries. The integral bunches are thereafter handled in the usual fashion for wine making. In other instances, particularly when the aim is to make raisins, it is entirely satisfactory to have individual berries, but it is undesirable to have the berries opened by stripping from the pedicel, although some berries in this condition can usually be tolerated. Thus, depending upon the intended use, it is sometimes desirable to detach integral grape bunches from the growing vines with few or no separate berries, and it is sometimes desirable to detach separate grape berries rather than integral bunches. It is always preferred to strip the berries from the pedicels without leaving any sort of wound. When we refer to detaching the grapes in the form of bunches or in the form of separate berries, we have reference to the form which predominates in the harvest, since with either form it is likely that a small fraction of the other form will be obtained. Stated differently, the harvest in one form is not absolute, but the percentage of the other form present is usually of no commercial or practical significance.

It is therefore an object of the present invention to provide a method of and machine for harvesting grapes effective, as a matter of choice, to remove grape bunches from the growing vines with a very small proportion of the grapes being detached as idnividual berries or to remove the grapes as separate, unwounded berries with a very small proportion of bunches.

Another object of the invention is to provide a method of and machine for harvesting grapes which can be effectively utilized by making only reasonable changes in the usual manner of growing grapes.

Another object of the invention is to provide a method of growing grapes effective to present the ripe grapes and grape bunches in a manner facilitating mechanical harvesting and without substantially reducing the annual yield of the grape vines.

Another object of the invention is to provide a method of harvesting grapes which does not involve undue manual labor in initially preparing the grape vines for mechanical grape harvest or in handling the grape vines after mechanical harvest.

Another object of the invention is to provide a machine for harvesting grapes which can effectively be utilized in vineyards already planted and which will operate without damage to the grape vines themselves.

Another object of the invention is to provide a machine for harvesting grapes which utilizes only a moderate amount of power and which can readily be utilized by field hands without particular training or skill.

Another object of the invention is in general to provide an improved method of and machine for harvesting grapes.

Another object of the invention is to provide a satisfactory grape harvesting machine.

A further object of the invention is to arrange or train grape vines in a manner to expedite mechanical grape harvesting.

Other objects together with the foregoing are attained in the methods of harvesting grapes and by the machines for harvesting grapes disclosed in the accompanying description. The machines and methods involved are illustrated in the accompanying drawings, in which:

FIG. 1 is an isometric view of a machine constructed according to the invention as it travels along a row of grape vines in a field and harvests the grape bunches therefrom;

FIG. 2 is a side elevation of one portion of a vineyard showing a grape vine trained for harvesting according to the method of the invention;

FIG. 3 is a transverse view, the plane of the view being indicated by the line 3—3 of FIG. 2;

FIG. 6 is a side elevation of the machine of FIG. 4 in operation in the vineyard;

FIG. 7 is a partial view similar to FIG. 4 showing a modified form of machine; and FIG. 8 is a side elevation showing a variant manner of arranging the grape vines.

Figure 5:
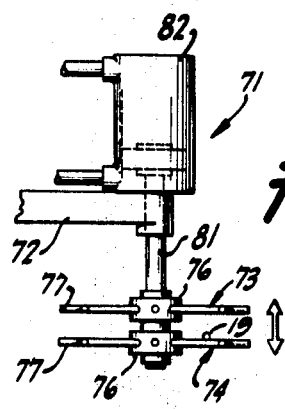
FIG. 5 is an end elevation of part of the vine-moving mechanism.
Figure 4:
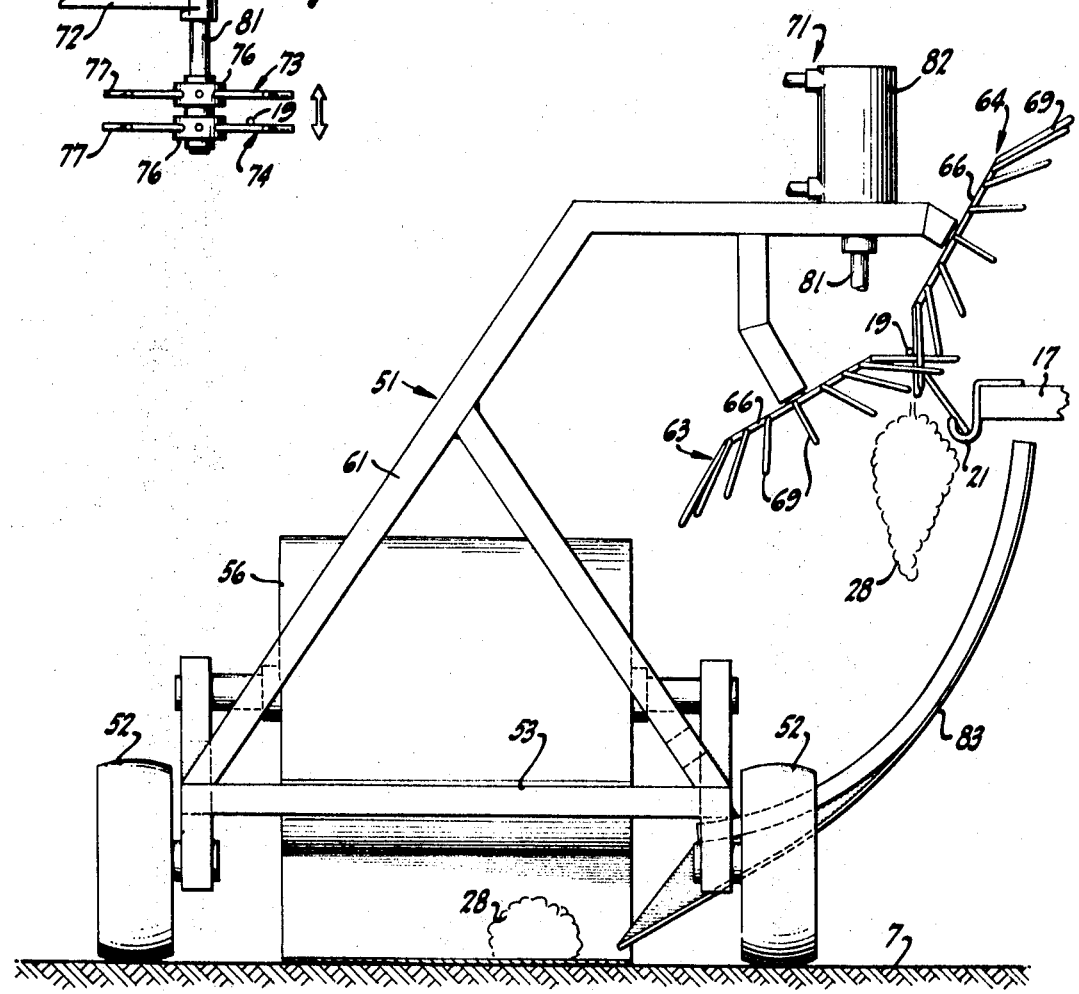
FIG. 4 is an end elevation of a machine in operation in a vineyard.

In order to utilize one form of the machine of the invention and to carry out one of the methods of the invention, a predetermined regimen is followed. The customary grape vine 6 grows in a vineyard having a ground level 7 from which the trunk 8 of the vine stands in an approximately vertical direction. Other similar vines are planted to form longitudinal rows. The trunk 8 is so trained and pruned that near its upper portion a plurality of arms 9 branch out in several substantially horizontal directions. The arms are the immediate supports for a number of shoots 12 which when new tend to grow vigorously in various directions, particularly upwardly.

To assist in the training of such shoots, a support post 16 is provided in the vineyard alongside each one of the vines 6 in the row. Each post is set in the ground and extends upwardly alongside the trunk 8. The post 16 has a height slightly above that of the branching arms 9 and is particularly provided with a cross member 17, in this instance of wood, and extending transversely of the row about equidistantly on opposite sides of the post 16. Since all of the vines in the row are provided with similar posts and cross members, it is easy to string a pair of longitudinally extending support wires 18 and 19 on the opposite ends of the successive cross members 17. While wires are referred to herein, it is understood that these are filamentary supports and can be of metal, or plastic or cord, or any material which will serve to support portions of the grape vines.

The wires 18 and 19 are preferably not permanently affixed to the cross members, but are carried in and partially confined by clips 21 having an outwardly or upwardly open configuration. The wires 18 and 19 are normally restrained and held in position but can, by appropriate movement, be detached from the clips and removed from the cross members. Initially, the wires 18 and 19 are about horizontal and substantially parallel to each other and are strung along both sides of a row with fair tightness so that they have only a moderate catenary sag.

The shoots 12 are freely permitted to grow upwardly and outwardly during one year, but at the beginning of the next year some selected ones of them are trained in the form of canes 26 to extend outwardly in a generally radial direction to lead to the adjacent wires from the arms 9 on the grape vine. Fruiting canes 26 for the current year are constituted by the previous year's new shoots and are trained along the adjacent wires 18 and 19 in both directions from the trunk. Each fruiting cane is tied to the adjacent wire with cord or the like at two points at least, one point being near the respective arm 9 and the other point being near the tip of the cane.

Stated differently, while fruiting canes 26, usually at least four in number, are trained from the arms onto and tied to the wires so that the four fruiting canes constituted by the previous year's new shoots extend along the parallel wires on opposite sides of the vine trunk 8 and in opposite directions, there remain new shoots 12 extending upwardly and growing during the current year so as to form the material for the fruiting canes to be subsequently trained for the succeeding year.

As the fruiting canes 26 grow along the wires, they edvelop the customary foliage and bunches 28 of grapes. Some of the bunches of grapes naturally develop on the undersides of the fruiting canes and initially hang by gravity, whereas others of the bunches initially develop above the fruiting canes 26 and above the wires. As they grow larger and get heavier, these other bunches gradually turn by gravity and eventually depend downwardly. Toward the end of the season, at about harvest time, virtually all of the bunches of grapes that have been developed from the trunk 8 are dependent from the fruiting canes 26, which remain substantially horizontal, being firmly supported by the substantially horizontal wires despite the fruit, branch and leaf load.

It is preferred that the various arms 9 and the immediately adjacent portions of the fruiting canes away from the wires be de-shooted or stripped in the early spring so that no leaves nor fruit develop in the immediate vicinity of the trunk 8 or away from the wire-supported fruiting canes. The amount of grape production on the new shoots 12 for next year's fruiting canes is minimal. The major production of the grape bunches is almost entirely along the wires 18 and 19 at a distance from the post 16 and at a distance from the arms adjacent the trunk 8. This method of propagation positions substantially the entire fruit output of the vine in the form of hanging grape bunches growing in rectilinear paths along the supporting wires 18 and 19 well exposed to atmospheric conditions and sun and readily accessible for harvesting. It has been found that this method of propagation and culture results in a yield comparable to the usual yield of plants cultivated in more nearly customary ways and that the general orientation and arrangement of the vine canes along the wire pairs is conducive to ready and simple hand tying of the fruiting canes to the wires and to cultural treatment of the vines during the growing season.

After harvest and at the end of the season, the current stripped fruiting canes are removed and for the next season the new shoots 12 are bent onto and trained along the supporting wires for repetition of the production cycle.

In order to harvest the bunches of grapes 28 depending in generally linear paths on both sides of and outstanding from the planted grape vines, we provide a particular machine. This machine includes a carriage 51 having a number of ground-engaging wheels 52 supporting a main frame 53. The carriage is designed to be drawn through a vineyard between adjacent rows of vines and is proportioned so that it can pass readily between the vine rows without interference with the vines. Preferably the leading end of the main frame of the carriage carries a roll 56 of suitable paper unrolled onto the ground beneath the carriage and between the wheels thereof as the carriage is advanced. The deposited paper affords a clean support for grapes to be harvested.

Included in the main frame 53 of the advancing carriage are superstructures 61 and 62 arranged at the leading and trailing portions of the carriage, respectively. The superstructures 61 and 62 each carry a pair of wheels 63 and 64. These include hubs 66 mounted to turn about intersecting axes. From the hubs, radial spokes 68 project in a circular array and spikes 69 in a conical array. The wheels 63 and 64 are not power driven but are situated so that the spikes 69 projecting therefrom are interspersed so that if one wheel is revolved, the other wheel revolves also. The spikes are engaged by the vine and act approximately as gear teeth so that the wheels turn together to provide a support mechanism without tearing or injury.

The position and height of the various wheels 63 and 64 are such that as the machine carriage moves along the vinyeard row, the adjacent wire; for example, 19, is progressively detached from the successive cross arm supports 17 by being removed from the retaining clips 21. A portion of the wire and the attached vine is thus moved away from the ground supports and is then supported on the machine by the wheels 63 and 64. The vine canes are usually moved upwardly and toward the space between rows. The fruiting canes are somewhat flexible and normally permit a fair degree of movement. If extra movement is desired, the fruiting canes when initially devolved from the trunk arms can be curved or convoluted to afford substantial spring-like or yielding motion between the arm and the wire. The section of the wire and the attached cane or canes disposed between the wheels 63 and 64 at the leading end of the machine and the wheels 63 and 64 at the trailing end of the machine are almost entirely supported by the machine itself. Since the fruiting canes and the attached bunches of grapes, although still attached to the trunk 8, are virtually supported by the wire and since the de-shooted canes leading to the wires or between the trunk 8 and the wires are somewhat flexible, the weight of the entire assembly of wire, fruiting canes and grape bunches is temporarily supported on the machine while still being attached to the trunk. As the carriage advances, successive sections of the wire are in turn supported by the wheels 63 and 64 and are then continuously discharged to the rear as the carriage leaves the vicinity.

Particularly pursuant to our invention, we provide means effective as the carriage advances to manipulate the particular wire section supported between the longitudinally spaced pairs of wheels. This wire manipulation is of a particular sort to detach grape bunches. It is accomplished by a special actuating mechanism 71 mounted on a frame extension 72 of the carriage. This includes a pair of wheels 73 and 74 each having a hub 76 and radially extending spikes 77 disposed in a circular array. The positioning of the wheels is such that they lie respectively below and above the wire and the attendant portions of the grape vine. As the carriage advances, the spikes "gear" with the vine and enter above and below the fruiting cane and the wire. There is no vine damage since the spikes enter and withdraw easily as the wheels are turned. The wheels are on a vertical plunger 81 connected to a reciprocatory motion mechanism 82 such as a hydraulic or pneumatic cylinder structure.

In the past, as particularly described in the above-identified paper, it has been customary to impart rapid vibration to a wire like the wire 19, but it has been found that such vibration produces a large number of separate, detached or stripped berries with considerable injury and only a few intact bunches.

In the present instance and in contradistinction to rapid vibrating motion, the cylinder mechanism 82 is connected to a source of power in such a way that the plunger 81 is given but a single cycle of long stroke oscillation at each one of successive, widely spaced time intervals. The cycle of oscillation is preferably first a downward excursion of approximately six inches or thereabouts, followed very abruptly by a reverse, upward excursion to the beginning elevation, the total time of the cycle being from .06 to .09 of a second, approximately. These limits are not exact and vary from time to time and with different conditions, but are given as examples of the nature of the jerk or snap or rapid acceleration which produces an unusual effect.

When the wire with the attendant fruiting canes and grape bunches is moved downwardly with rapid acceleration, the mass of the grape bunches or clusters is such that they lag behind. This snaps and breaks the cluster stems something like cracking the whip. This detaches most of the bunches, although a similar effect may occur if an attached bunch initiallly accelerates downwardly and cannot reverse and so detaches by failure of the cluster stem when the wire abruptly reverses its direction and moves upwardly toward intial position. This is believed to be for the reason that the peduncle or main stem of the matured grape bunch has an abscission zone adjacent the green shoot of the vine. This abscission zone is somewhat weaker than any other part of the rachis of the bunch so that the stem fails because of the jerk movement before any of the grape berries or any substantial number of the grape berries separate from their individual pedicels. The net result of this jerk operation is that the grapes are detached from the vine largely in bunches. Inevitably there are a few grape berries which are individually detached, but their percentage is much lower than has been attained heretofore by mechanical harvesting.

As the carriage is advanced along the row of vines, the plunger mechanism 81 is actuated through one cycle for each stage of advance of the machine, the weight on the wire behind the machine and the general attachment of the wire ahead of the machine keeping the wire fairly rigid and well suspended on the pairs of wheels 63 and 64. As the grape bunches are detached from or snapped off of the fruiting canes, they fall by gravity against a curved deflector plate 83 supported from the main frame in an inward and downward direction. The plate 83 underlies its respective one of the wires such as 18 and the grape bunches descending therefrom.

When the bunches are detached, they fall by gravity and gently collide with the inclined surface of the deflector plate and are then deflected horizontally to discharge onto the strip of paper previously laid down on the ground of the vineyard. These grape bunches are left to dry in the sun to form raisins. Alternatively, the paper may be dispensed with and the grape bunches may be immediately retrieved as table grapes, to make wine or the like.

As the carriage advances and as the plunger periodically snaps or jerks the wire to dislodge the grape bunches, the wire and attendant grape vine structure are left to droop behind the machine. No attempt is made by this device to re-attach the wire to the cross member since it is desired first to detach the fruiting canes from the wire and the arms so that the bare wires can be restrung for the reception of the new shoots for the succeeding year's production of grapes.

In actual practice, a device of the sort disclosed herein has been effective to detach grape bunches with only a small percentage of free berries. The frequency of oscillation of operation of the plunger 81 varies from time to time depending upon growing conditions and the like, but conveniently is of the order of one oscillation per second, which amounts to about one oscillation per foot of advance of the carriage. Also, the six-inch single excursion of the oscillating mechanism is not a rigid figure but can vary depending on the flexibility of the vines, the degree of weakness in the abscission zone and other comparable factors. For that reason, the plunger operator 81 is subject to adjustment and variation in accordance with the particular harvesting conditions.

Furthermore, while the machine has been illustrated as handling but a single wire on one side of the carriage at a time, it is preferred to provide a symmetrical machine so that the wires on both sides of the aisle between the rows of grape vines can simultaneously be harvested. This merely requires a duplication in mirror symmetry of the structure already illustrated and described.

It has been found that some variation in the method and machine can be accomplished for closer adaptation to other needs or other end uses of the grapes; for example, in making raisins, which usually are constituted of dried, individual grape berries, although sometimes whole bunches are dried. For making individual raisins, we have varied the method by deliberately cutting or separating the fruiting canes 26 from the arms 9 at points near the wires. This requires only a small amount of manual labor. The cutting is done several days (from two to six, usually) prior to harvest. For this type of harvesting the machine is not altered except it may be more convenient to replace each of the pairs of spiked wheels 63 and 64 with a single spiked wheel 86 as shown in FIG. 7. This is inclusive of a hub 87 from which radial spokes extend. Each of the spokes branches into a pair of spikes 88 and 89 forming a trough, in effect, and capable of lifting and displacing the wire and attached fruiting canes toward the harvesting machine as the machine advances. Since the canes have been previously cut from the arms 9, their flexibility is no longer important and substantial displacement of the canes from the arms 9 can easily be accomplished.

The machine is advanced along the row, as before, and the wire and fruiting canes are moved to be substantially entirely supported by the machine. The plunger 81 is then oscillated to move the wire and fruiting canes. In this instance, since individual berries are desired, the plunger can be rapidly vibrated. Because the canes have been severed and are no longer growing, it is found that the berries tend for the most part to shake from their individual pedicels without wounds, a certain drying or sealing having already taken place. The grapes are thus shaken off the fruiting canes and are deposited in good condition for further processing. The wire and severed canes are left lying on the ground for subsequent stripping and replacement of the wire for the next season.

What is claimed is:

1. A method of harvesting grapes comprising accelerating a grape vine fruiting cane while said fruiting cane is attached to said vine, with a jerk comprising applying single abruptly reversed cycles of long stroke vertical oscillations, successive cycles being separated by widely spaced time intervals and effective to detach said fruiting cane from a grape bunch previously hanging therefrom.

2. A method as in claim 1 including the step of first severing said fruiting cane from said vine and thereafter imparting the jerk to said severed fruiting cane to detach grapes therefrom.

3. A method as in claim 1 including the step of growing said fruiting cane in a horizontal position with grape bunches hanging therefrom by gravity and in which said jerk is attendant upon movement of said fruiting cane in a vertical direction against gravity.

4. A method as in claim 1 in which said fruiting cane is grown along and is supported by a horizontal wire and in which said wire and said fruiting cane are both jerked together as a single body whereby said grape bunch is detached.

5. A method as in claim 4 in which said fruiting cane is constituted by growing a new shoot of said grape vine separated from said wire and substantially without fruit during a preceding year and in the current year supporting said shoot grown in the preceding year in a horizontal position along and adjacent to said wire during the current fruit season.

References Cited

UNITED STATES PATENTS

| | | | |
|---|---|---|---|
| 2,929,184 | 3/1960 | Lamouria | 56—1 |
| 3,184,908 | 5/1965 | Rust | 56—330 |
| 3,328,944 | 7/1967 | Shepardson | 56—331 |
| 3,360,913 | 1/1968 | Burton | 56—330 |
| 3,371,473 | 3/1968 | Burton | 56—330 |
| 3,380,236 | 4/1968 | Shepardson | 56—330 |
| 3,426,517 | 2/1969 | Duncan, Sr. | 56—330 |
| 3,473,311 | 10/1969 | Fox | 56—330 |
| 3,490,217 | 1/1970 | Olmo et al. | 56—330 |

LOUIS G. MANCENE, Primary Examiner

J. A. OLIFF, Assistant Examiner

U.S. Cl. X.R.

56—330